Dec. 13, 1960 W. HEFTI 2,964,008
STABILIZER FOR DAMPING THE ROLLING MOTION OF SHIPS
Filed Jan. 24, 1957 2 Sheets-Sheet 1
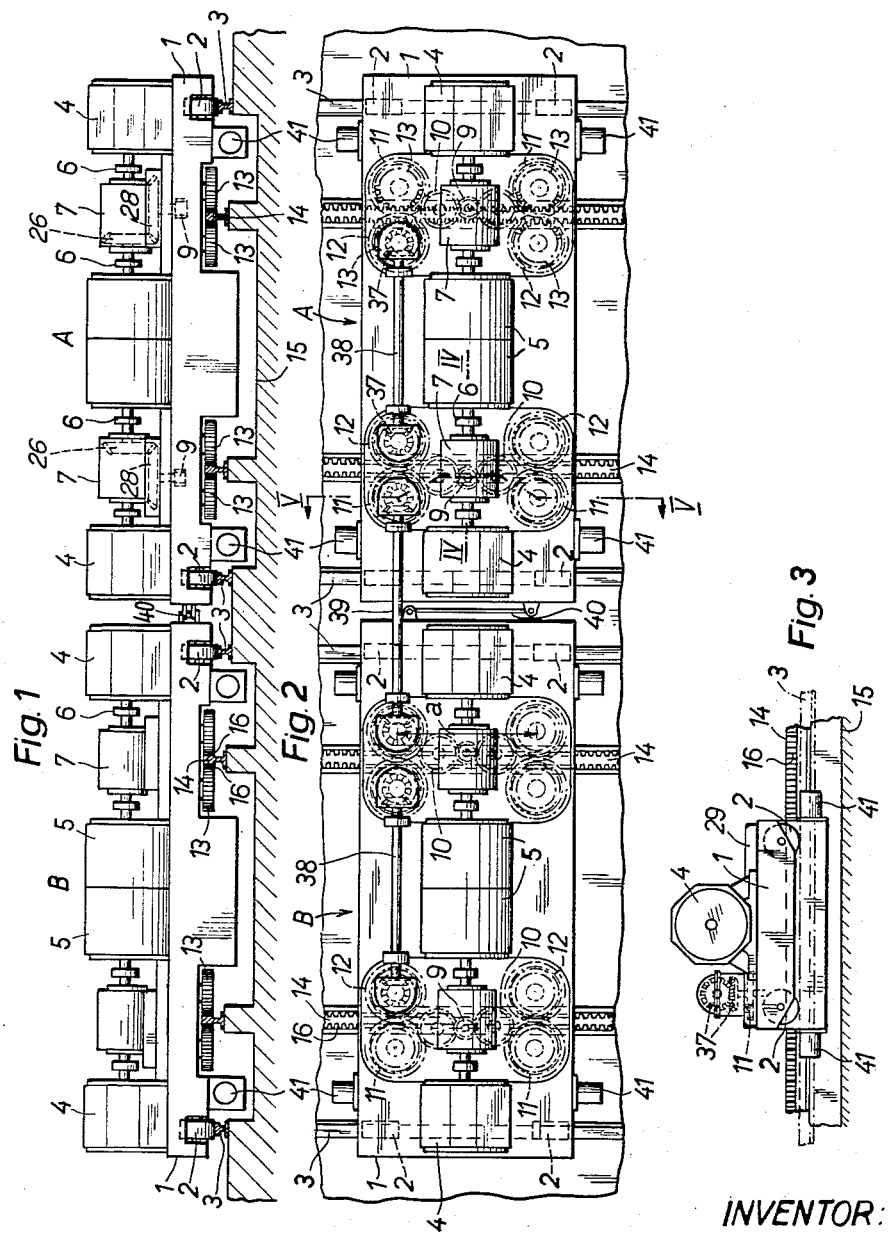
INVENTOR:
W. HEFTI Dec. 13, 1960  W. HEFTI  2,964,008
STABILIZER FOR DAMPING THE ROLLING MOTION OF SHIPS
Filed Jan. 24, 1957  2 Sheets-Sheet 2

INVENTOR:
W. HEFTI

United States Patent Office 2,964,008
Patented Dec. 13, 1960

2,964,008

STABILIZER FOR DAMPING THE ROLLING MOTION OF SHIPS

Walter Hefti, Winterthur, Switzerland, assignor to Schweizerische Lokomotiv- und Maschinenfabrik, Winterthur, Switzerland Filed Jan. 24, 1957, Ser. No. 636,114

Claims priority, application Switzerland Feb. 2, 1956

6 Claims. (Cl. 114—124)

The invention relates to a stabilizer for damping or reducing the rolling motion of ships, of the type wherein a travelling truck is used as stabilizing mass and is adapted for reciprocating movement along one or more toothed racks of the ship by means of an individual driving device.

In a known stabilizer of this kind, the driving unit located on the traveling or stabilizing truck comprises two driving motors which are operatively connected with a differenital gear which in turn is connected by means of a driving gear with a toothed rack extending transversely to the longitudinal axis of the ship.

For stabilizers of greater ships a single unit of the described kind does not suffice any more, since the greater forces to be exerted upon the rack would result into excessively high line pressures. By simply increasing the number of such driving units located on the stabilizing truck, however, an undesired amount of ship space would be required and the cost of construction would be comparatively high.

It is an object of the invention to provide an improved stabilizer for ships by means of which space and costs are saved. According to the invention, a stabilizer of the above mentioned type comprises a driving device having one or more driving units, each unit being operatively connected to a common toothed rack, at two points spaced longitudinally thereof, either by a single driving gear or by two opposite driving gears which are coupled to each other by a power transmission gear train and associated with devices for equalizing the tooth pressure.

If a further increase in mass and power of the stabilizer will be required, an additional driving unit may be provided adjacent to the first unit on the same travelling truck but cooperating with a second rack. In this manner the travelling truck must not be built longer in spite of the increased power of the device, and accordingly this arrangement does not cause any shortening of the maximum travelling path in the hull of the ship. In order to obtain equal travelling speeds, the two drive units, in addition, may be coupled together for rotation in a simple manner.

The present invention will now be described in more detail with reference to the accompanying drawings illustrating, by way of example, a preferred embodiment of the invention, and in which:

Figs. 1 to 3 show a view in elevation, a plan view and an end view, respectively, of a stabilizing apparatus.

Figure 4:
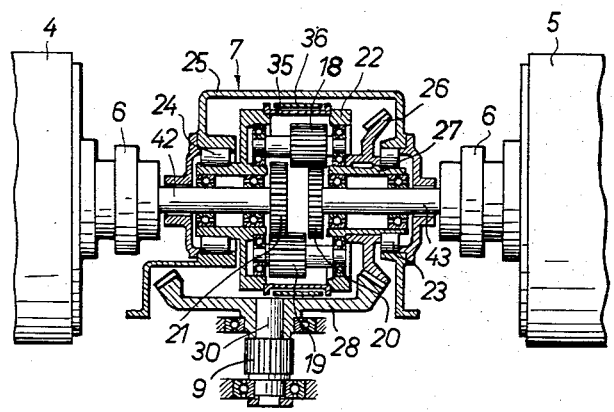
Fig. 4 is a longitudinal section, taken on line IV—IV of Fig. 2 of the differential and bevel gearing of the stabilizing apparatus.

The illustrated embodiment of the invention shows stabilizing equipment which is destined for very great stabilizing effects. For this purpose two travelling trucks A and B of identical construction are used, which are arranged one behind the other in longitudinal direction of the ship, and side by side in the direction of travel, respectively, so that the free travelling path provided between the ship walls will by no means be shortened by adding a second truck.

Mounted on each of the two travelling trucks A and B are two drive units, which are also arranged one behind the other in longitudinal direction of the ship. Each truck comprises a single truck chassis 1 supported on four spring mounted travelling wheels 2, which are able to roll on rails 3 extending in transverse direction of the ship.

Each drive unit comprises two coaxial electromotors 4 and 5, mounted on the truck 1. The casing of the inner motor 5 is combined with the casing of the motor 5 of the second drive unit. By means of couplings 6 the motors are operatively connected to an equalizing gear 7, and the latter is connected by intermediary of bevel gearing 26, 28 to a pinion 9. Engaging this pinion are two gears 10 of two gear transmission trains 10, 11, 12 which are situated symmetrically to the longitudinal centre plane of the travelling truck. The gears 11 and 12 are connected each to a driving gear wheel 13 having a vertical axis. The gear wheels 13 are meshing in pairs at two contact points transversely spaced by a distance $a$, with a toothed rack 14, which is mounted in the ship body 15 at right angles to the longitudinal direction of same. The rack illustrated is provided with teeth 16 at either side of its head portion. It is known in the art of building rack-railways as "Locher-rack" and permits small vertical movements of the truck or the driving gear wheels, without any influence on the clearance of the gearing. For this reason it is particularly useful in apparatus according to the present invention in which the gearing clearance should be kept as small as possible on account of the repeated change in travelling direction.

Figure 5:
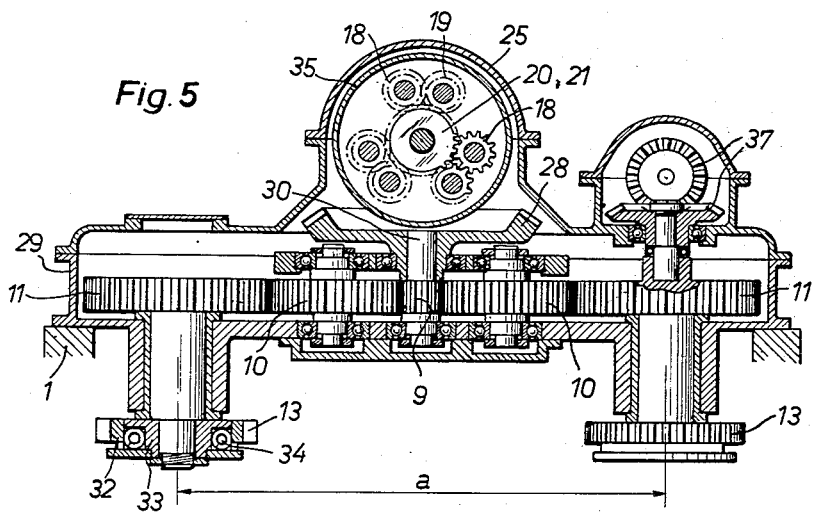
Fig. 5 is a transverse section, taken on line V—V of Fig. 2.

The equalizing gear 7 built as differential is shown more in detail in Figs. 4 and 5. It is a spur gear differential, having three pairs of planetary pinions 18 and 19. The opposite pinions 18, 19 of each pair are meshing with each other with their front halves facing each other, while the outer halves of each pinion are engaging the corresponding sun wheels 20, 21 of the two input shafts 42 and 43. The planetary gears 18, 19 are supported within a planetary carrier 22 which in turn rotates in two roller bearings 23 and 24 of the differential gear casing 25.

The construction of the bevel gearing is also shown in detail in Figs. 4 and 5. The driving bevel gear 26 is keyed to the hollow shaft 27 of the planetary carrier 22, while the driven bevel gear 28 is supported with its vertical output shaft 30 in the gear casing 29.

Finally, in the lower portion of Fig. 5, the details of the transmissions and of the driving gear wheels 13, engaging the rack, may be seen. The teeth carrying wheel rim 32 of the gears 13 is distinct of the wheel hub 33 and connected to said hub by means of coil springs 34 to obtain a resiliently yielding rotary drive connection; due to this arrangement, the gear pressures of the four driving gear wheels 13 belonging to one driving unit are approximately equalized. The yielding connections could also be accommodated in the transmission gear wheels 11 instead of in the driving gear wheels 13.

Illustrated in Fig. 4 is also a band brake, to which belongs the brake drum 35 secured to the planetary carrier 22 and also the brake strap 36. This brake, when actuated, thus effects all four driving gear wheels 13 by way of the bevel and spur gear transmissions. The casings of the differential and of the other gear wheels are protected against entering of dirt by shaft seals provided in usual manner.

As previously mentioned, each of the two travelling trucks carries a second driving unit, which is associated with an additional toothed rack. The two units are mechanically coupled to each other by the fact that an inner driving gear wheel 12 of one driving unit is interconnected for rotation to the other driving unit by means of a bevel gearing 37 and a transmission shaft 38. In this manner equal displacing speeds can be obtained with the two driving units.

A similar shaft connection is established between the two travelling trucks 1. In this case, two outer driving gear wheels 11 are connected to each other for rotation by way of a transmission shaft 39. A coupling rod 40, moreover, is provided as an additional equalizing and safety connection between the two travelling trucks.

For operation of the travelling trucks, the ship includes a stabilizing control apparatus from which the driving motors 4 and 5 are controlled. The motors can rotate already during standstill of the travelling trucks 1, owing to the presence of the differential gears 7, of which one rotates forwards and the other backwards at the same speed. When one of the motors is switched to another speed, the travelling truck will be accelerated or retarded dependent on the desired travelling direction. The band brakes 35, 36, acting upon the driving gear wheels 13, may also be used for braking and arresting the truck. In order to cushion the impacts, which may occur when the travelling truck inadvertently hits the ship walls, buffers 41 are secured to the underside of the travelling chassis.

I claim:

1. In a ship stabilizer having a stabilizing weight including a movable truck, rails extending transversely of the ship and supporting said truck, a rack bar extending parallel to said rails, said rack bar having teeth on opposite longitudinal sides thereof, and a driving unit mounted on said truck, said driving unit having a driving motor, the combinaton of pairs of driving gear wheels meshing with said rack bar at working points spaced longitudinally thereof, the two wheels of each pair engaging the opposite sides of said rack bar, a power transmission train connecting said driving motor to said pairs of driving gear wheels, and gear pressure equalizing means incorporated in said driving gear wheels.

2. In a ship stabilizer having a stabilizing weight including a truck, rails extending transversely of the ship and supporting said truck, a rack bar extending parallel to said rails, said rack bar having teeth on opposite longitudinal sides thereof, and a driving unit mounted on said truck, said driving unit having two driving motors, and a differential gear for coupling said two driving motors for permitting said motors to rotate continuously in opposite directions when said truck is stationary, the combination of two pairs of driving gear wheels meshing with said rack bar at two working points spaced longitudinally thereof, the two wheels of each pair engaging opposite sides of said rack bar, and power transmission gear trains between said differential gear and each pair of driving wheels.

3. A ship stabilizer as claimed in claim 2, in which one of the wheels of said gear trains has a separate hub and a separate gear rim, and torsion elastic coupling elements between said hub and rim.

4. In a ship stabilizer, the combination of a stabilizing weight comprising a plurality of trucks movable transversely of the ship and disposed in end to end relation longitudinally of the ship, rails extending transversely of the ship for supporting said trucks, two rack bars associated with each truck and extending parallel to said rails, said rack bars having teeth on opposite longitudinal sides thereof, two driving units mounted on each truck, each driving unit comprising two driving motors having driving shafts in axial alignment with each other and with the driving shafts of the other unit on the truck, a differential gear on each truck for coupling the two motors of one unit for permitting the motors of each unit to rotate continuously in opposite directions when the truck is stationary, two pairs of driving gear wheels meshing with each of said rack bars at two working points spaced longitudinally thereof, the two wheels of each pair meshing with the rack bar on opposite sides thereof, power transmission gear trains between said differential gears and each pair of driving wheels, the power transmission gear train of one driving unit being connected to the power transmission gear train of the other driving unit on the truck for obtaining equal speed of rotation of all driving gear wheels for the truck, and the power transmission gear train of a driving unit on one truck being connected to a power transmission gear train of a driving unit on an adjacent truck for obtaining equal travelling speeds for all trucks.

5. The combination claimed in claim 2 in which said power transmission gear train from said driving units to said rack bar engaging driving gear wheels includes a pair of intermeshing bevel gears having a vertical output shaft, a pinon on said shaft, and gear trains from said pinon to both pairs of rack engaging drive wheels.

6. The combination as claimed in claim 4, wherein adjacent travelling trucks are interconnected by a coupling member in the direction of movement of the trucks.

References Cited in the file of this patent

UNITED STATES PATENTS

| | | |
|---|---|---|
| 1,708,679 | Norden | Apr. 9, 1929 |
| 1,853,069 | Minorsky | Apr. 12, 1932 |
| 2,439,919 | Brecht | Apr. 20, 1948 |
| 2,695,586 | Montrose-Oster | Nov. 30, 1954 |